United States Patent [19]

Hideo et al.

[11] 4,330,668
[45] May 18, 1982

[54] PROCESS FOR PRODUCING AROMATIC POLYESTER WITH TRANSITION METAL SALT OF NAPHTHENIC ACID

[75] Inventors: Sato Hideo, Nobeoka; Takiguchi Teruo, Nakagun; Akimoto Norio; Ueno Ikuo, both of Nobeoka, all of Japan

[73] Assignee: Asahi Kasei Kogyo Kabushiki Kaisha, Osaka, Japan

[21] Appl. No.: 150,397

[22] Filed: May 16, 1980

[51] Int. Cl.³ .............................................. C08G 63/00
[52] U.S. Cl. ...................................... 528/271; 528/14; 528/15; 528/19; 528/125; 528/126; 528/173; 528/176; 528/181; 528/206; 528/207; 528/222; 528/225; 528/194
[58] Field of Search ............... 528/271, 181, 207, 225, 528/14, 15, 19, 125, 126, 173, 176, 194, 206, 222

[56] References Cited
U.S. PATENT DOCUMENTS 3,824,213 7/1974 Stackman ............................ 528/271
3,948,856 4/1976 Stackman ............................ 528/271
4,296,232 10/1981 Maresca et al. .................... 528/271

*Primary Examiner*—Harold D. Anderson

*Attorney, Agent, or Firm*—Sprung, Horn, Kramer & Woods

[57] ABSTRACT

In the production of an aromatic polyester by reacting at least one aromatic diester of the formula

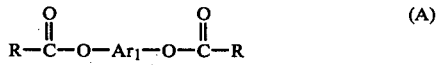

(A)

wherein
R is a hydrogen atom, an alkyl group having 1 to 6 carbon atoms or a cycloalkyl group having 3 to 8 carbon atoms; and
$Ar_2$ is an arylene group, with at least one aromatic dicarboxylic acid of the formula

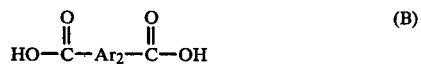

(B)

wherein
$Ar_2$ is an arylene group, in the presence of a catalyst, the improvement which comprises employing a transition metal salt of naphthenic acid as the catalyst.

13 Claims, No Drawings

PROCESS FOR PRODUCING AROMATIC POLYESTER WITH TRANSITION METAL SALT OF NAPHTHENIC ACID

BACKGROUND OF THE INVENTION

1. Field of the Invention

This invention relates to a process for producing an aromatic polyester from an aromatic diester and an aromatic dicarboxylic acid.

2. Description of the Prior Art

Aromatic polyesters derived from aromatic dicarboxylic acids and dihydric phenols have excellent chemical and physical properties such as high thermal resistance, high strength, low hygroscopicity, and high chemical and solvent resistances. Accordingly, it is known that the aromatic polyesters can be employed in a wide range of uses such as fibers, films, molded articles and coating materials.

One known method of producing these aromatic polyesters involves an interfacial polymerization comprising reacting an aqueous alkaline solution of a dihydric phenol with an aromatic dicarboxylic acid chloride dissolved in a water-immiscible organic solvent [see, for example, W. M. Eareckson, J.P.S., 40, 399, (1959)]. Another method comprises polymerizing an aromatic dicarboxylic acid and a bis-carboxylic acid ester of a dihydric phenol (see, U.S. Pat. Nos. 3,948,856 and 3,824,213). These methods, however, have some drawbacks. For example, according to U.S. Pat. No. 3,948,856 the resulting polymers are remarkably discolored, probably due to the presence of an inorganic strong acid radical, and the inorganic strong acid radical remaining in the polymers exerts an adverse effect on the properties of the polymers. Furthermore, the amount of the catalyst required is great and accordingly, the method becomes costly. Also, when the catalysts described in U.S. Pat. No. 3,824,213 are used, an undesirably long time is needed to obtain a polymer having a high degree of polymerization.

It is accordingly an object of the invention to find catalysts producing polymers free of these deficiencies.

SUMMARY OF THE INVENTION

This object is realized in accordance with the present invention pursuant to which there is provided a process for producing an aromatic polyester which comprises reacting at least one aromatic diester of the formula

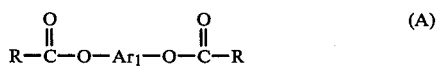

wherein
  R is a hydrogen atom, an alkyl group having 1 to 6 carbon atoms or a cycloalkyl group having 3 to 8 carbon atoms, and
  $Ar_1$ is an arylene group,
with at least one aromatic dicarboxylic acid of the formula

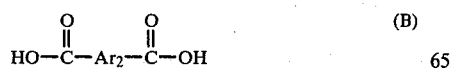

wherein
  $Ar_2$ is an arylene group,
in the presence of a transition metal salt of naphthenic acid.

DETAILED DESCRIPTION OF THE INVENTION

Advantageously R is hydrogen; an alkyl group having 1 to 6 carbon atoms, preferably 1 to 4 carbon atoms such as methyl, ethyl, propyl and butyl; or a cycloalkyl group having 3 to 8 carbon atoms such as cyclobutyl, cyclopentyl or cyclohexyl. If desired, the alkyl groups and the cycloalkyl groups may contain inert substituents which do not interfere with the formation of the aromatic diester or the acid interchange polymerization reaction between the aromatic diester and the aromatic dicarboxylic acid. Such inert substituents include chlorine, fluorine, alkoxy groups having 1 to 4 carbon atoms, keto groups and aryl groups, e.g. phenyl, halophenyl, etc.

$Ar_1$ and $Ar_2$ in the formulae (A) and (B) advantageously are substituted or unsubstituted arylene groups which do not interfere with the formation of the aromatic diester or the acid interchange polymerization reaction between the aromatic diester and the aromatic dicarboxylic acid.

Exemplary arylene groups which can be employed include:

(a) Substituted or unsubstituted para- or meta-phenylene groups of the formulae,

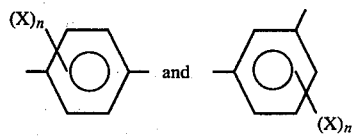

(b) Substituted or unsubstituted para- or meta-biphenylene groups of the formulae,

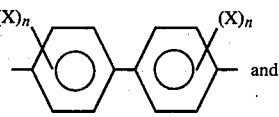

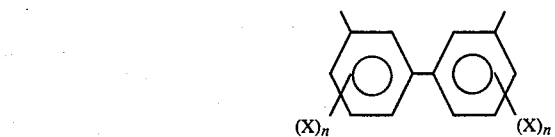

(c) Substituted or unsubstituted para- or meta-bridged biphenylene of the formulae,

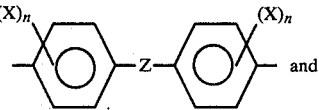

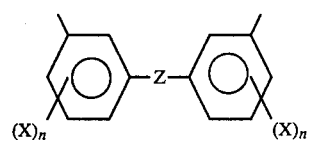

wherein Z is CO, O, S, $SO_2$ or $Si(R_1)_2$, $R_1$ is an alkyl group, an aryl group, $(CH_2)_n$, $C(CH_3)_2$ or

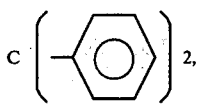

a cycloalkylidene group having up to 8 carbon atoms or any other inert bridging group, and
(d) Substituted or unsubstituted fused benzene ring structures of the formulae,

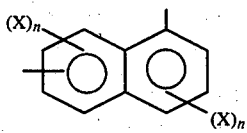 and

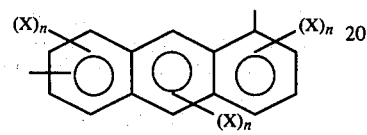

The substituent X in the above described structures (a)–(d) may be any inert substituent which does not interfere with the formation of the aromatic diester or the acid interchange polymerization reaction. Typically X is chlorine, bromine, fluorine, an alkoxy group with 1 to 4 carbon atoms, a keto group, an alkyl group with 1 to 4 carbon atoms or an aryl group, and n is an integer from 0 to 4.

The above described aromatic diesters may be prepared by any known esterification reaction. In general, dihydric phenols having the arylene group are reacted with, as esterification reactants, aliphatic or cycloaliphatic monocarboxylic halides or acid anhydrides in the presence of an esterification catalyst. For example, acid halides or acid anhydrides of formic acid, acetic acid, propionic acid, butyric acid, valeric acid, cyclobutanecarboxylic acid, cyclopentanecarboxylic acid and cyclohexanecarboxylic acid can be employed as suitable esterification reactants. A preferred esterification reactant is acetic anhydride.

Exemplary dihydric phenols include hydroquinone, chlorohydroquinone, dichlorohydroquinone, tetrachlorohydroquinone, bromoresorcinol, 3,3'-dihydroxybiphenyl, 4,4'-dihydroxybiphenyl, 4,4'-dihydroxyphenyl ether, 4,4'-dihydroxy-2,2'-dimethyldiphenyl ether, 4,4'-dihydroxy-3,3'-dichlorodiphenyl ether, bis(4-hydroxyphenyl)sulfide, bis(4-hydroxyphenyl)ketone, bis(4-hydroxyphenyl)methane, 1,1-bis(4-hydroxyphenyl)ethane, 2,2bis(4-hydroxyphenyl)propane commonly known "bisphenol A", 2,2-bis(4-hydroxy-3-chlorophenyl)propane, 2,2-bis(4-hydroxy-3,5-dichlorophenyl)propane, 2,2-bis(4-hydroxy-3-bromophenyl)propane, 2,2-bis(4-hydroxy-3,5-dibromophenyl)propane, bis(4-hydroxyphenyl)cyclohexylmethane, 2,6-dihydroxynaphthalene, mixtures thereof and mixtures with other aromatic diols than those above-described.

The esterification reaction is conducted by using the esterifying agent in an amount sufficient to completely esterify the dihydric phenol and thus form the aromatic diesters, generally with the dihydric phenol and the esterifying agent in a mole ratio of from about 1:2 to about 1:10. A temperature of from about 10° C. to about 140° C., preferably from about 20° C. to about 100° C. is employed. Exemplary esterification catalysts include basic compounds, such as sodium acetate, dimethyl aniline, pyridine and quinoline, and acidic compounds, such as concentrated sulfuric acid, sulfuric acid, potassium hydride and phosphorus pentoxide, and are employed typically in a catalytically effective amount. The esterification reaction time employed is that which is sufficient to form the diester of the starting dihydric phenol. The esterification reaction may be conducted in a solvent which does not interfere with the esterification reaction. Suitable solvents include benzophenone, diphenyl ether, hydrocarbons such as hexane, heptane, benzene, xylene and toluene, and halogenated hydrocarbons, such as dichloroethane, dichlorobenzene, dichloromethane and chloroform.

Exemplary aromatic dicarboxylic acids of the formula (B) include terephthalic acid, isophthalic acid, (4,4'-dicarboxydiphenyl)ether, (4,4'-dicarboxydiphenyl)methane, (4,4'-dicarboxydiphenyl)sulfone, (4,4'-dicarboxy)benzophenone, 1,8-naphthalenedicarboxylic acid and their inert nuclear substituted derivatives. Of these aromatic dicarboxylic acids, isophthalic acid and terephthalic acid are preferred due to their ready availability and low cost. Especially preferred is a mixture of isophthalic acid and terephthalic acid containing from about 5 to about 90% by weight, preferably from about 20 to about 60% by weight, of terephthalic acid based on the total weight of the mixture.

If desired or if necessary, an oxycarboxylic acid or an aliphatic dicarboxylic acid may be employed together with the aromatic diester and the aromatic dicarboxylic acid.

According to the invention, the aromatic diester and the aromatic dicarboxylic acid are reacted by acid interchange polymerization in the presence or absence of a solvent which does not interfere with the acid interchange polymerization and in the presence of an effective amount of a transition metal salt of naphthenic acid.

The characteristic feature of this invention is to employ a transition metal salt of naphthenic acid as the catalyst in the acid interchange polymerization between the aromatic dicarboxylic acid and the aromatic diester. The term "transition metal" as used herein includes those metals of atomic numbers 21 through 30, 39 through 47 and 57 to 80. Preferred transition metals are chromium, manganese, cobalt and nickel. The term "naphthenic acid" as used herein includes monocarboxylic acids of the naphthene or alicyclic series of hydrocarbons having the formula $Y(CH_2)_n COOH$, wherein Y is a cyclic nucleus consisting of at least one five-membered ring. Of these compounds, cyclopentaneacetic acid and homologous mixtures containing, as the main component, cyclopentaneacetic acid are preferred. Naphthenic acid containing a small amount of a mineral oil may also be employed.

The amount of the transition metal salt of naphthenic acid as the catalyst which can be employed typically ranges from about 0.0001 to about 2% by weight, preferably about 0.001 to about 0.4% by weight, based on the total weight of the mixture of the aromatic diester and the aromatic dicarboxylic acid reactants. Furthermore, the transition metal salt of naphthenic acid may be used together with a conventional catalyst.

The aromatic diester and carboxylic acid component corresponding to the aromatic dicarboxylic acid are generally employed in substantially stoichiometric amounts. A preferred mole ratio of the aromatic diester to the carboxylic acid component is about 0.95:1 to about 1.05:1. A more preferred mole ratio is about 0.97:1 to about 1.03:1.

The solvent which can be employed has a boiling point ranging typically from about 220° C. to about 350° C., preferably from about 240° C. to about 320° C.

Exemplary solvents include benzophenone, diphenyl ether, diphenyl sulfone, triphenyl ether, tetraphenyl ether, halogenated biphenyls, diphenyl oxide, halogenated diphenyl oxide and halogenated naphthalenes.

The reaction temperature which can be employed typically ranges from about 220° C. to the boiling point of the solvent employed or to about 320° C. without any solvent.

It is preferred to conduct the acid interchange polymerization in an inert atmosphere such as nitrogen, argon or helium. The pressure employed in the polymerization zone is usually atmospheric and, in order to produce an aromatic polyester having a high degree of polymerization, a reduced pressure can be advantageously employed in the later stage of the polymerization reaction.

The acid interchange polymerization is continued for a period of time sufficient to provide an aromatic polyester having a desired reduced viscosity ($\eta$ sp/c, measured with a 1% solution of the aromatic polyester in a 60/40 (W/W) mixture of phenol/sym-tetrachloroethane at 35° C.). The reduced viscosity of the aromatic polyester formed which is chosen may vary depending upon the properties required for its use and is typically at least about 0.4, preferably about 0.6 or more, and more preferably about 0.7 or more. According to this invention, aromatic polymers having a reduced viscosity of at least about 0.7 can be easily produced.

The process of this invention may be carried out in any convenient manner or apparatus desired, and the following is one suitable example of the present process:

Into a reactor equipped with an inlet for nitrogen, a stirrer and a short fractionating column are charged an aromatic diester, an aromatic dicarboxylic acid, an inert solvent and an effective amount of a transition metal salt of naphthenic acid. The mixture is reacted under heating in a nitrogen atmosphere while by-products of the acid interchange polymerization are removed by distillation. After the reaction is continued so as to obtain an aromatic polyester having the desired degree of polymerization, the resulting polymer solution, as such or after having been admixed with the solvent employed in the acid interchange polymerization, is added under stirring to a liquid medium which does not dissolve the aromatic polyester, resulting in finely divided powder. Such a liquid is an alcohol, a hydrocarbon or a ketone. Of these compounds, acetone is preferred from the viewpoints of availability and price.

If necessary or if desired, the molecular weight of the aromatic polyester can be further increased by heating the aromatic polyester in the form of powder at a temperature just below its melting point. Also, the modification of the molecular weight of the aromatic polyester can be effected either by controlling the reaction time or by adding at least one monohydric phenol or at least one chain transfer agent such as a monobasic acid halide in a small amount, for example about 0.1 to about 5% by weight based on the bifunctional compounds to the reaction mixture during the acid interchange polymerization or after near completion of the polymerization reaction.

Exemplary monohydric phenols include phenol, ortho-, meta- or paracresol, 2,3-, 2,4-, 2,6- or 3,5-xylenol, ethyl-, propyl-, isopropyl-, butyl-, tert-butyl-, acyl-, phenyl-, naphthyl-, phenoxy-, methoxy- or ethoxyphenol and phenols in which at least one hydrogen atom linked to the benzene nucleus is subtituted with a halogen atom such as chlorine atom, fluorine atom, bromine atom or iodine atom. Exemplary monobasic acid halides include benzoyl chloride, benzoyl bromide, benzoyl iodide, toluoyl chloride, naphthoyl chloride and biphenylcarbonyl chloride.

Since the aromatic diesters are suitable starting materials for the polymerization reaction, the process of this invention has been described above in terms of the first esterification reaction and the second acid interchange polymerization reaction. These two reactions can be continuously conducted in a single reaction zone. More specifically, an aromatic diol, an esterifying agent and an aromatic dicarboxylic acid as starting materials together with a transition metal salt of naphthenic acid are dissolved in a solvent or melted without using any solvent and reacted firstly under esterifying conditions and secondly under conditions for acid interchange polymerization to form an aromatic polyester.

Since the polymerization reaction of this invention proceeds at comparatively low temperatures, it is unnecessary to raise the polymerization temperature to where the solvent is distilled off and accordingly the viscosity of the polymer formed does not become extremely high due to removal of the solvent which would render difficult the recovery of the polymer. Further, since the amount of the catalyst employed is very small, the color of the aromatic polyester is excellent and the thermal resistance of the aromatic polyesters is good. According to the present process aromatic polyesters of a high degree of polymerization can be obtained in a shorter period of time than heretofore and, as a result, the productivity is good, there is hardly any thermal degradation of the product and its color is excellent.

The aromatic polyesters obtained by the present process are especially suitable for injection molding. They may be made into films by extrusion, calendering or casting with a solvent and into fibers by melt spinning or by dry or wet spinning using a suitable solvent.

The aromatic polyesters of this invention may contain any conventional plasticizers, pigments, lubricants, releasing agents, stabilizers and other fillers.

The present invention will now be illustrated in greater detail with reference to several examples, but they are given for illustrative purposes only and are not to be construed as limiting the invention. In these examples reduced viscosities of the obtained polymers were determined by the following equation:

$$\eta \, sp/c = \frac{\frac{T}{T_0} - 1}{C}$$

wherein
- T is the falling time (seconds) of the polymer solution measured at 35° C.;
- $T_0$ is the falling time (seconds) of the solvent, i.e., a 60/40 (W/W) mixture of phenol/sym-tetrachloroethane measured at 35° C.;
- C is the concentration expressed in grams of the polymer per 100 ml of the polymer solution.

EXAMPLE 1

Into a separable flask equipped with an inlet for nitrogen, a stirrer and a short fractionating column were charged 62.46 g of the diacetate of 2,2-bis(4-hydroxyphenyl)propane, 23.20 g of isophthalic acid, 10.0 g of terephthalic acid, 0.04 g of cobalt naphthenate (content of cobalt: 6% by weight, product of Wako Pure Chemical Ind. Ltd.) and 60 ml of benzophenone. The mixture was heated at 280° C. in a nitrogen atmosphere and subsequently at 300° C. for 3 hours in a nitrogen atmosphere. The resulting reaction mixture was cooled and added to acetone to precipitate a polymer. As a result, 70.5 g of a white polymer having a reduced viscosity of 0.77 were obtained.

EXAMPLE 2

The procedure of Example 1 was repeated except that only 0.002 g of the cobalt naphthenate was employed. 71.2 g of a white polymer having a reduced viscosity of 0.75 were obtained.

The polymer was dissolved in methylene chloride to prepare a solution having a polymer concentration of 30% by weight. Then the methylene chloride solution was poured onto a glass plate and placed in a drier at 60° C. to remove the solvent and to form a film. This film had a thickness of 0.035 mm and a tensile strength of 4.9 Kg/mm$^2$.

EXAMPLE 3

In the same flask as in Example 1 were charged 62.46 g of the diacetate of 2,2-bis(4-hydroxyphenyl)propane, 23.20 g of isophthalic acid, 10.0 g of terephthalic acid and 0.04 g of the cobalt naphthenate as in Example 1. The mixture was heated at a temperature of 240° C. to 300° C. for 2 hours and then at 300° C. for one hour under a reduced pressure of 0.5 mmHg in a nitrogen atmosphere. As a result, 69.8 g of a colorless, transparent polymer having a reduced viscosity of 0.74 were obtained.

EXAMPLE 4

In the same flask as in Example 1 were charged 45.60 g of 2,2-bis(4-hydroxyphenyl)propane, 23.20 g of isophthalic acid, 10.0 g of terephthalic acid, 51.2 g of acetic anhydride and 60 ml of benzophenone. The mixture was heated in a nitrogen atmosphere at 100° C. for 0.5 hour and then at 175° C. for one hour. Then to the reaction mixture was added 0.04 g of the same cobalt naphthenate as in Example 1, and the obtained mixture was heated in a nitrogen atmosphere at 280° C. for one hour and subsequently at 300° C. for one hour. The reaction mixture thus obtained was cooled and added to acetone to precipitate a polymer. As a result, 70.8 g of a pale yellow polymer having a reduced viscosity of 0.80 were obtained.

EXAMPLE 5

The procedure of Example 1 was repeated except that the resulting reaction mixture was further heated in a nitrogen atmosphere at 320° C. for 2 hours to distill off the benzophenone instead of adding the reaction mixture to acetone. As a result, 70.3 g of a yellowish polymer having a reduced viscosity of 0.88 were obtained.

EXAMPLE 6

The procedure of Example 1 was repeated except that 0.04 g of nickel naphthenate (product of Wako Pure Chemical Ind. Ltd.) was employed instead of 0.04 g of the cobalt naphthenate. As a result, 71.0 g of a white polymer having a reduced viscosity of 0.79 were obtained.

EXAMPLE 7

The procedure of Example 1 was repeated except that 0.06 g of chromium naphthenate (content of chromium: 3% by weight, product of Nihon Kagaku Sangyo Co., Ltd.) was employed instead of the cobalt naphthenate. As a result, 70.5 g of a yellowish polymer having a reduced viscosity of 0.65 were obtained.

EXAMPLE 8

The procedure of Example 1 was repeated except that 0.036 g of manganese naphthenate (content of manganese: 9% by weight, product of Wako Pure Chemical Ind. Ltd.) was employed instead of the cobalt naphthenate. As a result, 70.9 g of a yellow polymer having a reduced viscosity of 0.75 were obtained.

EXAMPLE 9

In the same flask as in Example 1 were charged 140.4 g of the diacetate of 2,2-bis(4-hydroxyphenyl)propane, 16.7 g of the diacetate of bis(4-hydroxyphenyl)sulfone, 24.9 g of isophthalic acid, 58.1 g of terephthalic acid and 0.04 g of the same cobalt naphthenate as in Example 1. The mixture was heated in a nitrogen atmosphere from 200° C. to 280° C. over a period of one hour, at 280° C. for 30 minutes, brought to 300° C. and further heated at 300° C. for one hour under a reduced pressure of 0.5 mmHg to give 171.8 g of a yellowish polymer having a reduced viscosity of 0.70.

EXAMPLE 10

In the same manner as in Example 3, 62.46 g of the diacetate of 2,2-bis(4-hydroxyphenyl)propane and 33.20 g of isophthalic acid were reacted in the presence of 0.04 g of the same cobalt naphthenate as in Example 1 to give 69.4 g of a polymer having a reduced viscosity of 0.67.

EXAMPLE 11

In the same flask as in Example 3 were charged 45.6 g of 2,2-bis(4-hydroxyphenyl)propane, 10.6 g of isophthalic acid, 16.6 g of terephthalic acid, 51.2 g of acetic anhydride and 30 ml of benzophenone. The mixture was heated in a nitrogen atmosphere at 100° C. for 30 minutes and then at 175° C. for one hour. To the reaction mixture was added 0.04 g of the same cobalt naphthenate as in Example 1 and the mixture was heated from 240° C. to 280° C. over 3 hours and then heated at 300° C. for one hour under a reduced pressure of 0.5 mmHg. The resulting reaction mixture was cooled and added into acetone to separate a polymer. As a result, 70.3 g of polymer having a reduced viscosity of 1.06 were obtained.

COMPARATIVE EXAMPLE 1

The procedure of Example 5 was repeated except that cobalt acetate in an amount as set forth below was employed instead of the cobalt naphthenate. The results are shown below:

| Amount of Cobalt Acetate (g) | Reduced Viscosity (η sp/c) | Color |
| --- | --- | --- |
| 0.04 | 0.45 | brown |
| 0.096 | 0.60 | brown |
| 0.120 | 0.56 | bluish purple |

COMPARATIVE EXAMPLE 2

In the same flask as in Example 1 were charged 62.46 g of the diacetate of 2,2-bis(4-hydroxyphenyl)propane, 23.20 g of isophthalic acid, 10.0 g of terephthalic acid, 0.25 g of cobalt acetate and 100 ml of benzophenone. The mixture was heated in a nitrogen atmosphere at 280° C. for one hour, and subsequently raised to 300° C. The reaction was continued at this temperature in a nitrogen atmosphere and small amounts of polymer samples were collected from the reaction mixture after 3, 7, 11 and 23 hours, respectively. The reduced viscosities of the polymers were 0.56, 0.59, 0.53 and 0.52, respectively. Even if the amount of the catalyst was increased and the reaction time was prolonged, there was no increase in the viscosity of the obtained polymer.

COMPARATIVE EXAMPLE 3

In the same flask as in Example 1 were charged 62.46 g of the diacetate of 2,2-bis(4-hydroxyphenyl)propane, 23.2 g of isophthalic acid, 10.0 g of terephthalic acid, 0.1 g of nickel nitrate, 0.1 g of nickel acetate and 50 ml of diphenyl ether. The mixture was heated in a nitrogen atmosphere at 250° C. for one hour and subsequently at 300° C. for 2 hours. Then heating was stopped and a polymer was taken out from the flask. The resulting polymer was colored dark brown and the reduced viscosity was 0.65.

While the invention has been described in detail and with reference to specific embodiments thereof, it will be apparent to one skilled in the art that various changes and modifications can be made therein without departing from the spirit and scope thereof.

What is claimed is:

1. In the production of a shaped article-forming aromatic polyester by polymerizing a composition comprising (1) an aromatic diester reactant of the formula

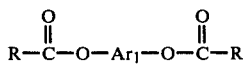

wherein
R is a hydrogen atom, an alkyl group having 1 to 6 carbon atoms or a cycloalkyl group having 3 to 8 carbon atoms, and
$Ar_1$ is an arylene group,
(2) an aromatic dicarboxylic acid reactant of the formula

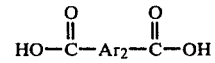

wherein
$Ar_2$ is an arylene group,
and (3) a catalyst, the improvement wherein the catalyst is a transition metal salt of naphthenic acid.

2. The process of claim 1, wherein the transition metal salt of naphthenic acid is cobalt naphthenate, manganese naphthenate, nickel naphthenate or chromium naphthenate.

3. The process of claim 1, wherein the transition metal salt of naphthenic acid is present in about 0.0001 to about 2% based on the total weight of the aromatic diester and the aromatic dicarboxylic acid.

4. The process of claim 1, wherein the transition metal salt of naphthenic acid is cobalt naphthenate.

5. The process of claim 1, wherein the transition metal salt of naphthenic acid is nickel naphthenate.

6. The process of claim 1, wherein the aromatic diester is the diacetate of 2,2-bis(4-hydroxyphenyl)propane.

7. The process of claim 1, wherein the aromatic diester is a mixture of the diacetate of 2,2-bis(4-hydroxyphenyl)propane and the diacetate of bis(4-hydroxyphenyl)sulfone.

8. The process of claim 1, wherein the aromatic dicarboxylic acid comprises isophthalic acid.

9. The process of claim 1, wherein the aromatic dicarboxylic acid comprises terephthalic acid.

10. The process of claim 1, wherein the aromatic dicarboxylic acid is a mixture of isophthalic acid and terephthalic acid.

11. The process of claim 1, wherein the polymerization is effected in a solvent having a boiling point of about 220° C. to about 350° C.

12. The process of claim 11, wherein the solvent is benzophenone.

13. The process of claim 3, wherein the transition metal is cobalt or nickel naphthenate, the aromatic diester comprises the diacetate of 2,2-bis(4-hydroxyphenyl)-propane, the aromatic dicarboxylic acid comprises at least one of the isophthalic acid and terephthalic acid, and the process is effected in benzophenone as solvent.

* * * * *